Manlove & Green,
Corn Harvester.
No. 58,349. Patented Sep. 25, 1866.
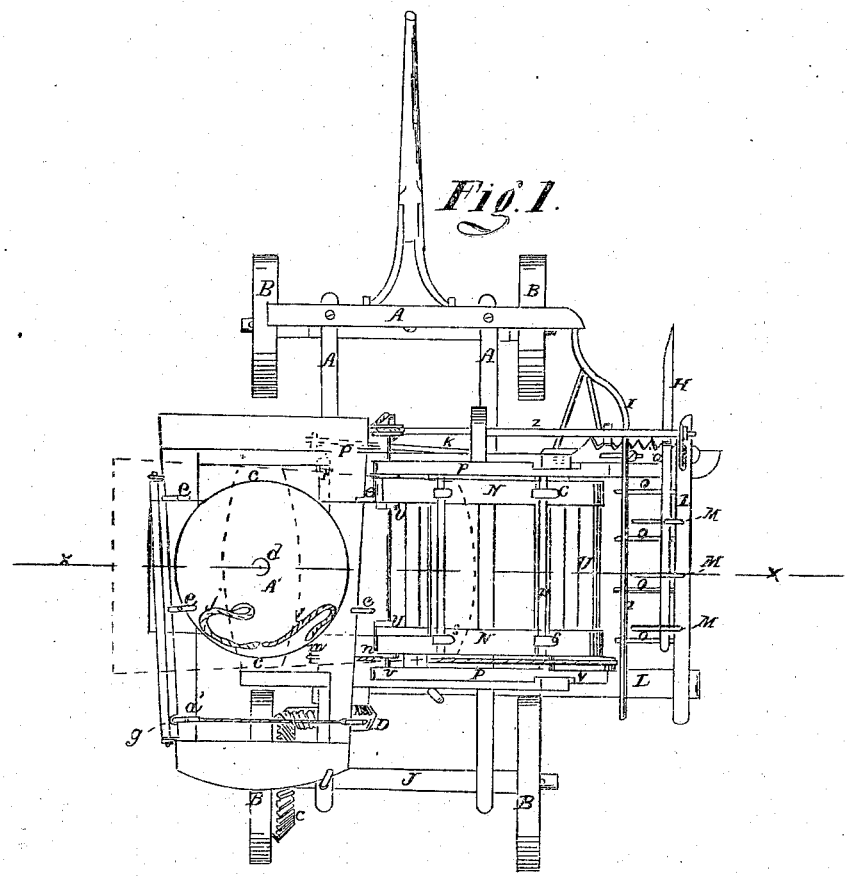
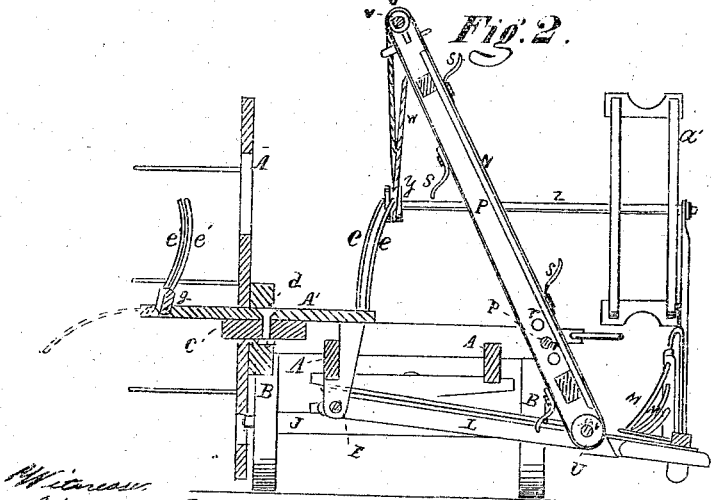

UNITED STATES PATENT OFFICE.

GEO. H. MANLOVE AND J. P. GREEN, OF CHICAGO, ILLINOIS, ASSIGNORS TO GEO. H. MANLOVE.

IMPROVEMENT IN CORN-HARVESTERS.

Specification forming part of Letters Patent No. 58,349, dated September 25, 1866.

*To all whom it may concern:*

Be it known that we, GEORGE H. MANLOVE and JONATHAN P. GREEN, of Chicago, in the county of Cook and State of Illinois, have invented a new and useful Improvement in Corn-Harvesters; and we do hereby declare that the following is a full, clear, and exact description of the construction and operation of the same, reference being had to the annexed drawings, making a part of this specification, in which—

Figure 1 is a top view, and Fig. 2 is a sectional view through the line $x\ x$, Fig. 1.

Similar letters indicate like parts in all the figures.

Our invention consists in an arrangement and combination of parts, hereinafter more fully described, by means of which Indian corn, sugar-cane, and other standing crops are cut, formed into a bundle or shock, and bound, and afterward placed in an upright position with the larger or butt ends on the ground, whereby a great saving is effected both in time and labor.

To enable others skilled in the art to make and use our invention, we will proceed to describe its construction and operation.

A A, Figs. 1 and 2, is a rectangular frame supported on wheels B B. To one of the hind wheels a spur-wheel, C, Fig. 1, is attached, which revolves when the machine is in motion, and gears into the wheel D on the shaft E, which has a crank, P, on its forward end, to which the pitman-rod K, with the cutters $a$, are attached, thus giving a reciprocating movement to the cutters for cutting the crop.

H is a guard, which is bent downward and projects beyond the cutters, in order to raise up any stalks that may be bent downward. The guard H is attached to the cutter-frame L by means of bent rods M, which pass through holes in the cutter-frame, and are bent over to pass through corresponding holes in the guard H. The bent rods M also serve to guide the stalks to the endless apron for conveying the stalks to the binder.

I is a curved rod attached to the frame of the machine, and guides the cut stalks upon the pins $o\ o\ o$, which receive the cut stalks, preventing the latter from being operated upon by the projections $s\ s$ on the belt N until after the stalks have fallen on the pins $o\ o$. The frame L may be adjusted to cut higher or lower by means of the rod $p$ being made to enter different holes $r\ r$, Fig. 2, in the frame P, which carries the endless belt N, one end of the frame L being hinged to the shaft E to give it freedom of motion.

N is an endless belt having projections $s\ s$ upon it for carrying the cut stalks, and moving on rollers U U, situated on the shafts $v\ v'$, which have their bearings in the frame P. To the forward end of the shaft $v$ a pulley is attached, which, by means of a band, $w$, passing over said pulley and around the pulley $y$ on the reel-shaft $z$, gives motion to the latter and to the reel.

Motion is given to the endless conveying-apron N by means of a pulley, $m$, on shaft E, which is connected by a band, $n$, with the shaft $v'$.

A′ is a table pivoted at $d$ to a hinged piece, $c$, which has its bearings in the frame of the machine. $e\ e$ are curved rods attached to the inner sides of the table A′, and $e'\ e'$ are similarly-formed rods attached to a piece, $g$, which is hinged to the outer edge of the table, and operated by a spring which causes the piece $g$, with rods $e'\ e'$, to assume an upright or vertical position when no force is actuating the rods $e'\ e'$. $f\ f$ are bands or cords, attached to the table A′, for the purpose of binding the shock temporarily after it is conveyed by the endless apron N onto the table A′.

It will be seen that the table A′ can, by the arrangement described, be rotated horizontally upon its axis $d$, and is capable, also, of a motion in a vertical plane by reason of its connection with the piece $c$. The movement is thus that of a universal joint.

Hooks attached to the main frame, and connected with the binding-table A′, are employed to prevent the table from discharging a shock until desired by the operator.

The operation of the machine is as follows: The stalks, when the machine is in motion, are cut by the cutters and fall upon the pins $o\ o\ o$, the guard H serving to raise up any stalks which are bent over, and the guide-rod I conveying the stalks upon the pins $o\ o\ o$, and preventing any of the teeth of the endless belt from seizing the stalks until they have fallen upon said pins. The stalks are conveyed by the teeth or projections on the endless belt upon the table A', the bands $ff$ being open, so as to receive or embrace the shock, and when the driver perceives a sufficient quantity of stalks has fallen upon the table to form a shock he stops the machine, ties temporarily (or rather tucks) the bands $ff$ around the shock, revolves the table A' upon its axis horizontally, then tilts the table so that it will occupy the position shown in red in Fig. 2. The bands $ff$ are then untied or untucked, and the stalks are thus left standing in the field with their larger or butt ends upon the ground.

As the machine again moves on to cut another shock the pins $e'$ $e'$ and piece $g$, the latter being hinged to the table, are moved by the standing shock in the forward movement of the machine away from said shock; and when the latter is passed the pins $e'$ $e'$ again, by the action of the spring described, assume an upright or vertical position. The table is then moved into its original position and the operation is again repeated.

It is obvious that by slight modifications the machine could be used on an ordinary wagon. Both hind wheels also could be employed as the source from which the driving-power is obtained.

Having thus fully described our invention, what we claim as new, and desire to secure by Letters Patent, is—

1. The guard H, in combination with the rods M, pins $o$ $o$, for receiving the stalks, curved rods I, and cutters $a$, substantially as described.

2. In combination with the above, the endless apron, cutters, and reel, situated on the adjustable frame L, the whole being constructed and operated substantially in the manner and for the purpose set forth.

3. The table A', connected to the frame of the machine by a universal joint, and having rods $e$ $e$, attached to said table, and rods $e'$ $e'$, attached to the hinged piece $g$, and cords or bands $ff$, the whole being constructed and operated substantially in the manner and for the purpose set forth.

4. The guard H, cutters $a$, rods M and I, and pins $o$ $o$, in combination with the endless conveyer N and table A', constructed as described, the whole being operated substantially in the manner and for the purpose set forth.

To the above specification of our machine for cutting, bunching, binding, and shocking Indian corn, hemp, sugar-cane, and other standing crops we have signed our hands this 8th day of May, 1866.

GEORGE H. MANLOVE.
JONATHAN P. GREEN.

Witnesses to signature of G. H. Manlove:
ALEXR. A. C. KLAUCKE,
W. F. HALL.

Witnesses to signature of J. P. Green:
JOHN C. RICE,
ED. VAN HASEN.